No. 691,554. Patented Jan. 21, 1902.
M. LEATHERMAN.
VEHICLE DRAG.
(Application filed May 11, 1901.)
(No Model.) 2 Sheets—Sheet 1.
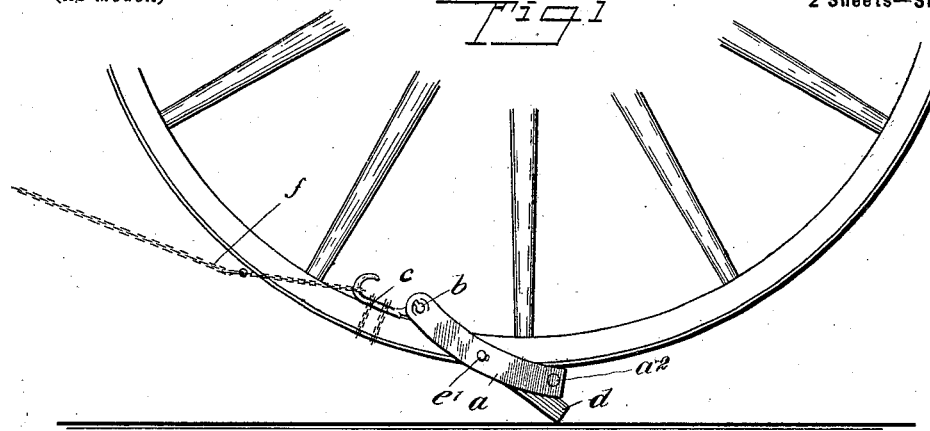
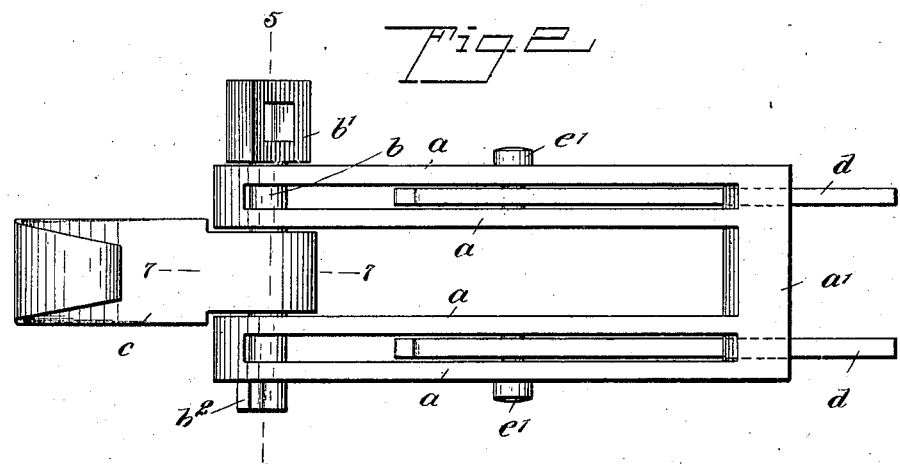
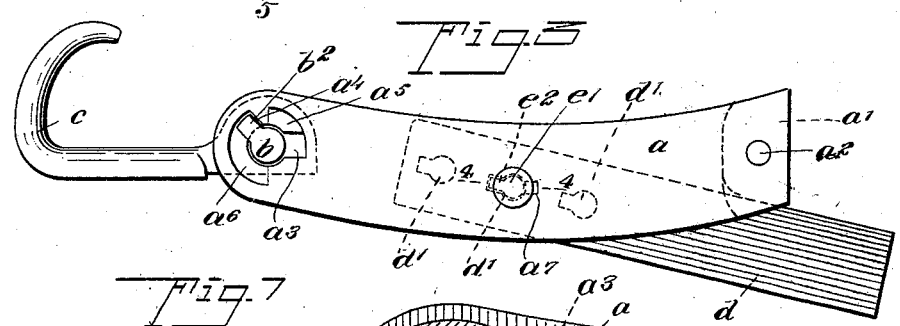
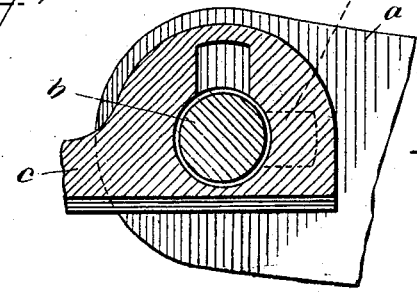
WITNESSES:
INVENTOR
Martin Leatherman
BY
ATTORNEYS No. 691,554. Patented Jan. 21, 1902.
M. LEATHERMAN.
VEHICLE DRAG.
(Application filed May 11, 1901.)
(No Model.) 2 Sheets—Sheet 2.
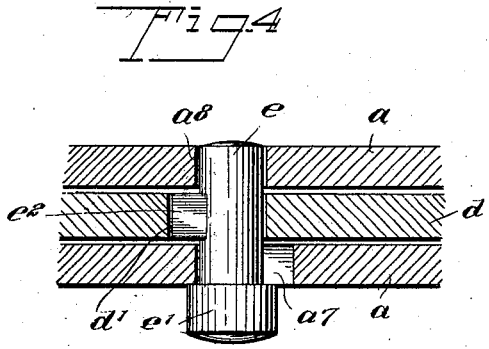
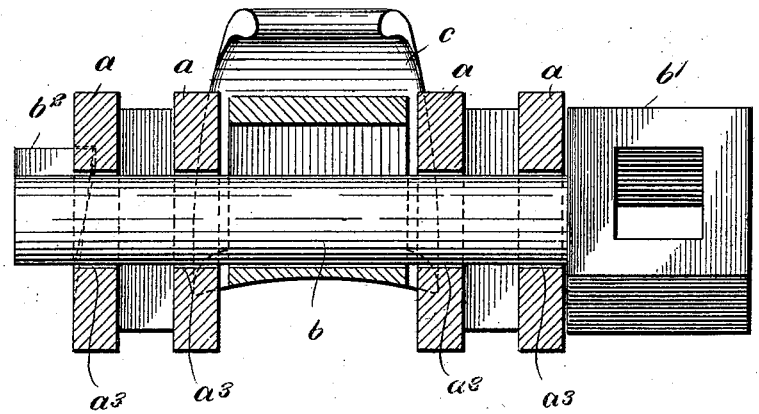
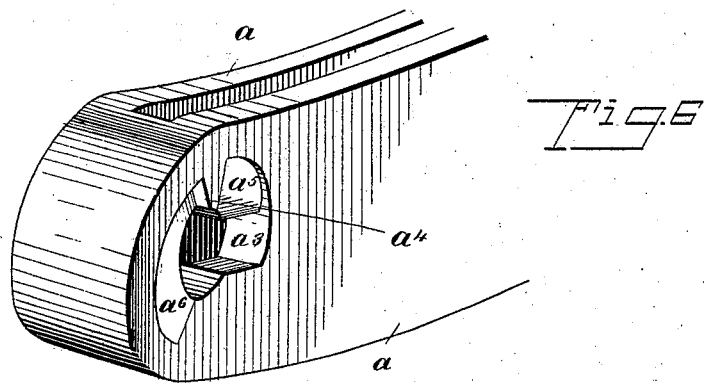
WITNESSES:
J. A. Brophy
J. B. Owens
INVENTOR
Martin Leatherman
BY
ATTORNEYS

UNITED STATES PATENT OFFICE.

MARTIN LEATHERMAN, OF GARDEN CITY, MINNESOTA.

VEHICLE-DRAG.

SPECIFICATION forming part of Letters Patent No. 691,554, dated January 21, 1902.

Application filed May 11, 1901. Serial No. 59,798. (No model.)

*To all whom it may concern:*

Be it known that I, MARTIN LEATHERMAN, a citizen of the United States, and a resident of Garden City, in the county of Blue Earth and State of Minnesota, have invented a new and Improved Vehicle-Drag, of which the following is a full, clear, and exact description.

This invention relates to a device for retarding the movement of vehicles, and is especially adaptable to wagons and sleighs to prevent them from running down inclines covered with ice or snow.

To this end the invention comprises a peculiarly-constructed drag which is adapted to be applied to the vehicle, under the wheel or runner thereof, and to support it on the ground, the engagement of the drag with the ground holding the vehicle back sufficiently to prevent it from crowding the team.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view showing my invention in use. Fig. 2 is a plan view of the drag. Fig. 3 is a side elevation thereof. Fig. 4 is a section on the line 4 4 of Fig. 3. Fig. 5 is a section on the line 5 5 of Fig. 2. Fig. 6 is a detail perspective view illustrating the peculiar form of the lock-shoulder on the drag, and Fig. 7 is a cross-section on the line 7 7 of Fig. 2.

The drag comprises two parallel side portions, each made up of a pair of parallel plates $a$. The plates $a$ of each side portion are joined rigidly together at the rear end of the drag by a cross-piece $a'$, which may be either integral with or secured rigidly to the side pieces of the drag. $a^2$ represents a bolt, which passes through the cross-piece $a'$ to strengthen it. The front ends of the side pieces of the drag are connected together by a lock-pin $b$, having at one end a head or finger-piece $b'$ and at the other end a transversely-disposed feather $b^2$. The plates $a$ of each side piece of the drag are preferably joined together by forming them solid at their front ends, as shown, and these plates are formed with openings $a^3$ therein, such openings being transversely alined, so that the pin $b$ may be passed through them. Each opening $a^3$ comprises a major portion and a minor offset portion, the major portions of the openings receiving the body of the pin $b$, and the offset portions serving to permit the passage of the feather $b^2$. One of the side pieces of the drag is formed on its outer face, directly adjacent to the opening $a^3$ thereof, with a shoulder $a^4$. Leading up to this shoulder from the minor portion of said opening $a^3$ is an arc-shaped inclined surface $a^5$, and leading from the shoulder $a^4$ and running into the plane of the outer face of the side piece $a$, bearing the shoulder, is an inclined surface $a^6$. Both of these inclines are curved concentrically to the opening $a^3$, adjacent to which they are. The minor portions of the openings $a^3$ are transversely alined, and when the feather $b^2$ of the pin $b$ registers with these minor portions the pin may be moved freely into and out of engagement with the side pieces of the drag. After the pin $b$ has been placed in position, as shown in Fig. 3, it is turned around its axis in such a direction that the feather $b^2$ will be caused to ride up on the incline $a^5$ and fall into engagement with the shoulder $a^4$. The pin $b$ will now be in its locked position, the shoulder preventing the return of the pin to the position previously described. When it is desired to disengage the pin from the drag, it is turned so as to ride the feather $b^2$ along the incline $a^6$, causing the feather to first engage the outer surface of the side piece having the inclines and then to fall into the minor portion of the opening $a^3$ in said side piece, whereupon the pin may readily be withdrawn. The side pieces of the drag should be formed of metal of any sort desired sufficiently resilient to cause the feather $b^2$ of the pin $b$ to be firmly engaged when in locked position—*i. e.*, when engaged with the shoulder $a^4$—and capable of springing slightly together as the feather $b^2$ rides up the incline. Held by the pin $b$ is a hook $c$, which is fitted between the side portions of the drag and has an opening for the reception of the pin and also a minor portion or branch opening permitting the passage of the feather $b^2$.

Carried by each side portion of the drag-body is a drag-plate $d$. These drag-plates are therefore two in number, and they are fitted, respectively, between the members of the pairs of plates $a$, forming the side pieces. Formed in the outer side piece $a$ of each pair of side pieces is a keyhole-slot $a^7$ and registering with these slots are orifices $a^8$ in the inner members of each pair of side pieces. These slots and orifices are designed to receive pins $e$, which have each a head $e'$ and a key or feather $e^2$, situated intermediately of its ends, so that the key lies between the members of each pair of side pieces $a$. The drag-plates $d$ are formed with a number of keyhole-slots $d'$ therein adjacent to their upper ends. By moving the drag-plates $d$ so that one of their keyhole-slots $d'$ registers with the corresponding slots $a^7$ the pins $e$ may be inserted in place to secure the drag-plates, and then by turning the drag-plates so as to place the slots $a^7$ and $d'$ out of registry the drag-plates will be locked securely in position. But one slot $d'$ of each drag-plate is in use at the same time; but by forming several slots in the drag-plate as the lower or working ends of the drag-plates wear away the plates may be shifted to project farther below the drag-body.

In using the invention the pin $b$ is removed and the side portions of the drag-body are caused to straddle the rim of the wheel, the cross-piece $a'$ lying under the same, as shown in Fig. 1. The pin $b$ and hook $c$ are now placed in position and the drag-plates $d$ are turned so that their free ends will be projected rearward from the pins $e$ and below the drag-body. A chain or other connection $f$ is attached to the hook $c$ and wrapped around the rim of the wheel, as shown, from which it is led forward to the front axle or to any other convenient part of the vehicle, so as to prevent the displacement of the drag. The entire weight of the wheel and so much of the vehicle as is borne by the wheel will now be sustained on the drag, and it is obvious that the two plates $d$, bearing on the frozen or slippery ground, will prevent the vehicle moving rapidly. By applying one of these drags to each rear wheel of a vehicle or to each rear runner of a sleigh the sluing or swerving of the vehicle may be effectively prevented.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. A vehicle-brake comprising a drag-body having a portion to lie under the running member of the vehicle, and provided with a drag-plate carried by said drag-body, and arranged laterally to the running member of the vehicle whereby the drag-plate may extend alongside the running member of the vehicle, substantially as set forth.

2. A vehicle-brake comprising a drag-body having side members to extend on opposite sides of the running member of the vehicle, and a rear cross-bar to extend beneath the running member of the vehicle and having means for connecting the front ends of the side portions of the drag-body above the running member of the vehicle whereby the drag-body will have portions extending alongside the member of the vehicle and beneath the same at the rear end of the drag-body, and the connecting device extending over the running member of the vehicle at the front end of the drag-body, substantially as set forth.

3. A vehicle-brake comprising the drag-body having parallel side portions adapted to straddle a part of a running member of a vehicle and separated by an intermediate opening, means connecting the parallel side portions at their opposite ends, and a drag-plate held at its front end in the intermediate opening of the drag-body at a point between the front and rear connections of the side portions of such body substantially as set forth.

4. A vehicle-brake, comprising a drag-body having parallel plates and a cross portion or abutment at the rear ends of said plates, means for holding the drag-body in position, and a drag-plate pivotally connected between the parallel plates of the drag-body and extended thence beneath the cross portion or abutment and arranged to engage the ground.

5. A vehicle-brake, comprising a drag-body having parallel side portions capable of straddling a part of a running member of a vehicle, whereby their front ends may extend above the lower portion of the running member, a pin removably engaged with one end of the drag-body and extending between the side members thereof and above the lower portion of the running member, and means for holding the drag-body in place, such means having connection with the pins.

6. The combination of a member having an orifice therein, the orifices comprising a major and a minor portion, said major portion also having a shoulder adjacent to the orifice and having curved inclines leading respectively to and from the minor portion of the orifice and from and to the shoulder, and a pin fitted in the orifice and having a key working with the shoulder and inclines.

7. A vehicle-brake comprising a drag-body having parallel portions arranged to extend on opposite sides of the running member of a vehicle and having said side members slotted longitudinally, and drag-plates held at their front ends in the slots of the said side members, and ranging on opposite sides of the running member of the vehicle, substantially as set forth.

8. A vehicle-brake comprising the drag-body having the side members spaced apart and a rear connecting portion between the rear ends of the side members whereby the side members may extend on opposite sides of and the connecting member extend below the running member of the vehicle, means for connecting the front ends of the side members and the separate drag-plates carried by the side members and ranging on opposite sides of the running member of the vehicle, substantially as set forth.

9. In a vehicle-brake, a drag-body having side members provided with longitudinal slots and a cross-bar connecting the rear ends of said member and arranged to underlie the running member of the vehicle, the slots of the side members being closed at their rear ends by cross portions, and the separate drag-plates secured at their front ends within the slots of their respective members and extending beneath the closed or cross portion at the rear ends of said slots, substantially as set forth.

10. In a vehicle-brake of the class described, a drag-body provided with means by which it may be secured to the running member of the vehicle, and drag-plates secured at their forward ends adjustably to the drag-body at the opposite sides thereof whereby the drag-plates will lie on opposite sides of the running member of the vehicle, substantially as set forth.

11. A vehicle-brake having a body portion arranged for application to the running member of the vehicle and provided at its rear end with a portion to underlie the rim of the said running member and at its front end with means to overlie such rim of the running member of the vehicle, substantially as set forth.

12. A vehicle-brake comprising the drag-body having a rear connecting portion arranged to underlie the running member of the vehicle and side portions extending forwardly from the opposite ends of the rear connecting-bar and arranged to lap on opposite sides of the rim of the running member and to project at their front ends above the said rim and means connecting the side members at their front ends, such means extending above the rim of the running member, and separate drag-plates carried by the opposite side members and extending beneath the drag-body at the rear end of the latter, substantially as set forth.

In testimony whereof I have signed my name to this specification in the presence of two subscribing witnesses.

MARTIN LEATHERMAN.

Witnesses:
JOSEPH LEATHERMAN,
G. MURPHY.